(12) United States Patent
Lin et al.

(10) Patent No.: US 6,313,222 B1
(45) Date of Patent: Nov. 6, 2001

(54) COMPATIBLE BLENDS OF POLYVINYLIDENE FLUORIDE AND AROMATIC POLYIMIDE

(75) Inventors: Shiow-Ching Lin, Lawrenceville; Michael Coates, Morristown, both of NJ (US); Eli M Pearce, New York; Ping-Tsung Huang, Brooklyn, both of NY (US)

(73) Assignee: Ausimont USA, Inc., Thorofare, NJ (US)

( * ) Notice: Subject to any disclaimer, the term of this patent is extended or adjusted under 35 U.S.C. 154(b) by 0 days.

(21) Appl. No.: 09/410,796

(22) Filed: Oct. 1, 1999

Related U.S. Application Data

(63) Continuation-in-part of application No. 09/053,114, filed on Apr. 1, 1998, now abandoned.

(51) Int. Cl.[7] .................................................. C08L 79/08
(52) U.S. Cl. ............................................ 525/180; 524/514
(58) Field of Search .............................. 525/180; 524/514

(56) References Cited

U.S. PATENT DOCUMENTS

| | | | |
|---|---|---|---|
| 3,668,193 | 6/1972 | King | 260/857 |
| 4,433,104 | 2/1984 | Giles, Jr. | 525/180 |
| 4,770,939 | 9/1988 | Sietses et al. | 428/402 |
| 4,816,516 | 3/1989 | Yamaya et al. | 525/180 |
| 4,822,122 | 4/1989 | Yamamoto et al. | 350/96.31 |
| 5,030,394 | 7/1991 | Sietses et al. | 264/28 |
| 5,496,889 | 3/1996 | Schlund et al. | 525/166 |

FOREIGN PATENT DOCUMENTS

| | | |
|---|---|---|
| 0 126 781 | 5/1984 | (EP) . |
| 0 251 741 | 7/1988 | (EP) . |
| 55127462 | 1/1980 | (JP) . |
| 631453536 | 6/1988 | (JP) . |
| 2308856 | 12/1990 | (JP) . |

OTHER PUBLICATIONS

European Search Report for EP 99 10 5911 Published Jul. 15, 1999.

*Primary Examiner*—Ana Woodward
(74) *Attorney, Agent, or Firm*—Norris, McLaughlin & Marcus

(57) ABSTRACT

A miscible polymer blend of superior mechanical strength, hardness and abrasion or mar resistance comprising PVDF and at least one compatible aromatic polyimide. The aromatic polyimide in the miscible polymer blend acts as a nucleating agent for PVDF crystallization. The miscible polymer blend comprising PVDF and aromatic polyimide does not exhibit the negative characteristic of reduced mechanical strength encountered in PVDF and polymer alloys known in the art. The PVDF/aromatic polyimide alloy is prepared by dissolving, separately, PVDF and the aromatic polyimide in a solvent and blending the solutions to form the required composition.

12 Claims, 3 Drawing Sheets

COMPATIBLE BLENDS OF POLYVINYLIDENE FLUORIDE AND AROMATIC POLYIMIDE

CROSS REFERENCE TO RELATED APPLICATIONS

This is a Continuation-in-Part of application Ser. No. 09/053,114 filed on Apr. 1, 1998 now abandoned.

BACKGROUND OF INVENTION

The present invention relates to an alloy comprising a miscible polymer blend of polyvinylidene fluoride ("PVDF") and aromatic polyimide compounds which has superior characteristics for mechanical strength, and provides greater hardness and heat resistance. The invention surprisingly reveals that miscible aromatic polyimide compounds are effective nucleating agents for PVDF crystallization and, thus, forming the miscible polymer blend by blending of the aromatic polyimide compound with PVDF affects nucleation of PVDF crystallization.

PVDF has application in the construction industry as an architectural coating because its excellent weatherability provides for long lasting coatings. PVDF and PVDF alloys can be formed into extrusion molded products. PVDF is widely used in the chemical processing industry for piping and valves and as the lining and coating material for storage tanks and reaction vessels because of its mechanical strength and resistance to chemical degradation. PVDF also possesses desirable electrical properties for use as jacketing materials in wire and cables.

PVDF has a glass transition temperature around −45° C. and is a rubbery material in its amorphous state at room temperature. PVDF has high crystallinity in its solid state which results in a high modulus and good mechanical strength. PVDF is generally stable and resistant to weathering and thermal and chemical degradation. For certain applications, optical clarity of PVDF is a significant characteristic. Material strength, modulus, heat and thermal resistance and chemical resistance are significant criteria for the performance of PVDF as an architectural coating and in the chemical processing industry. The high heat resistance is a significant criteria for extrusion of PVDF materials as molded products.

Blending polymers has been an important industrial approach towards development of novel polymeric materials. PVDF has been identified as compatible with a few industrial polymers, including alkyl methacrylate and alkyl acrylates having carbon content on alkyl groups of less than 3. The polymers compatible with PVDF have the common characteristic of high concentrations of C=O groups, particularly on side chains of the carbon polymer. It is known from prior art that PVDF is compatible with poly(methyl methacrylate) ["PMMA"]. See, for example, U.S. Pat. No. 4,770,939. PVDF is compatible with acrylic resins because of hydrogen bonding between C=O groups of the acrylic resin and the $CH_2$ groups of vinylidene fluoride. PVDF is also compatible with polyethyl methacrylate ("PEMA").

It is known in the art that PVDF can be miscibly blended with an acrylic resin at around a 70:30 ratio, by weight, of PVDF to acrylic resin to provide optimum coating performance with respect to criteria such as adhesion, toughness and optical clarity. Blending of PVDF with acrylic resins, however, generally results in reduction of modulus, heat resistance, hardness and abrasion or mar resistance compared to PVDF alone. The reduction of these properties serves to limit the application of PVDF blends.

It was recently disclosed in the art that PVDF can be blended with aromatic polyesters in the presence of a compatibilizing agent to develop PVDF alloys with good mechanical strength and impact resistance for use in the chemical processing industry and electrical industry as molded articles. (See, U.S. Pat. No. 5,496,889). It was recently found that PVDF blended with a compatible copolymer containing imide moieties results in a PVDF alloy of superior strength. (See, Lin, S. C. and Burkes, S. J., "Compatible Polyvinylidene Fluoride Blends with Polymers Containing Imide Moieties", application pending concurrently.) The present invention discloses that a miscible polymer blend of PVDF and an aromatic polyimide will create a PVDF alloy of superior mechanical strength, resulting in a material with greater heat and chemical resistance as compared with the prior art.

All percentages and ratios set forth herein are by weight/ weight unless specifically designated otherwise.

SUMMARY OF THE INVENTION

It is an object of the present invention to develop miscible polymer blends of PVDF and aromatic polyimides to formulate a PVDF alloy system with superior mechanical performance, and heat and chemical resistance. Accordingly, the present invention addresses the combination of PVDF with a commercially available aromatic polyimide compounds, such as polyether imide, to provide compatible miscible polymer blends of PVDF and aromatic polyimide compounds and the physical characteristics of such novel alloy systems.

DETAILED DESCRIPTION OF THE INVENTION

In the following description, the invention is described in terms of a preferred embodiment, but such description should not limit the scope of the invention, which is set forth in the accompanying claims.

PVDF has a glass transition temperature around −45° C. and a high crystalinity of 45 to 65 percent, which provides PVDF with good mechanical strength. PVDF particularly useful for the invention are polymers comprising the homopolymer vinylidene fluoride or copolymer comprising more than about 80% polyvinylidene fluoride and up to about 20% hexafluoropropylene. Compatible blends of PVDF and acrylic resins result in significant reductions in crystallinity, and hardness and decreased heat, chemical and abrasion resistance. The technical approach to developing a PVDF alloy without the corresponding dramatic loss in crystallinity, hardness and abrasion resistance is use of a polymer miscible with PVDF that has a high glass transition temperature.

Figure 1:
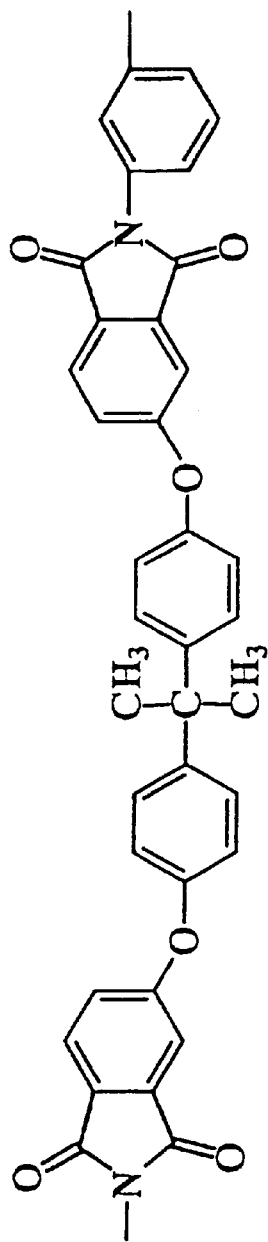
FIG. 1 is the carbon structure of polyether imide utilized according to the present invention.

The acrylic resin polymers miscible with PVDF share the common characteristic of high concentrations of C=O groups. The aromatic imide group utilized according to the present invention, polyether imide, contains two C=O linkages in its five member ring. The carbon structure of polyether imide utilized according to the present invention is set forth in FIG. 1. PVDF is generally miscible with polymers and copolymers having a high content of C=O groups, because the highly polarized $CH_2$ group of the polyvinylidene fluoride can form hydrogen bonds with the C=O groups. Hence, it anticipated that PVDF will be miscible with aromatic polyimide compounds which contain high concentrations of C=O groups.

Commercially available aromatic polyimide compounds provide excellent chemical, heat and thermal resistance. Aromatic polyimide compounds have high glass transition temperatures. For example, the aromatic polyimide compound described hereinafter to demonstrate the compatibility of PVDF with aromatic polyimides, the polyether imide commercially known as Ultem 1000, available from The General Electric Company has a glass transition temperature of 223° C. Such aromatic polyimide compounds would be found to create PVDF alloys that have superior mechanical strength compared to the PVDF alloys disclosed in the prior art.

It is surprising discovered, however, that combining about 0.1% to about 99.9% PVDF, preferably about 50% to about 99%, with about 99.9% to about 0.1% aromatic polyimide, preferably about 50% to about 1%, results in a miscible polymer blend of PVDF and aromatic polyimide. Miscible polymer blends are polymer blends that are homogeneous down to the molecular level associated with a negative value of the free energy of mixing. PVDF and aromatic polyimide blends or alloys are not known in the art to be miscible blends. The homogeneous miscible polymer blend of PVDF and aromatic imide unexpectedly results in a miscible polymer blend with superior mechanical strength than PVDF and aromatic polyimide alloys known in the art, in part, as a result of the homogeneous mixing of the polymers. Alloys of PVDF and other materials known in the art, which do not form miscible polymer blends, exhibit the negative characteristic of reducing the mechanic strength of the PVDF in the alloy compared to non-blended PVDF. Such reduction of strength of the PVDF is not experienced with the miscible polymer blends of the invention.

Mixtures of Hylar® brand PVDF supplied by the assignee of the present application and Ultem 1000 polyether imide available from The General Electric Company illustrate the compatibility of PVDF and aromatic polyimides as miscible polymer blends. Separate solutions of the PVDF and polyether imide were prepared by dissolving the material separately in N-methylpyrrolidone at room temperature. The solutions were then mixed at various concentrations ranging from 90 to 10 percent PVDF content by weight in the PVDF/aromatic polyimide compound miscible polymer blend. The mixed solutions were then stirred overnight and cast onto micro slides to form films. The micro slides were dried under a vacuum at 90° C. for two days.

The thermal behavior of the dried samples was analyzed using differential scanning calorimetric methods ("DSC"). Each sample was heated to 250° C. and isothermally held at that temperature for 3 minutes to remove the thermal history of the cast film. The samples were then cooled to −90° C. at a rate of 10° C. per minute to understand the crystallization temperature. The samples were then re-heated to 250° C. at a rate of 10° C. per minute to examine the melting behavior of the samples.

DSC analysis revealed that the melting point of PVDF when blended with the polyether imide decreased consistently with the melting point depression of PVDF when blended with other compatible polymers known in the art. This characteristic indicates good thermodynamic interaction and miscibility between polyether imide and PVDF.

DSC analysis reveals that the normalized heat of crystallization/fusion decreases with increased content of polyether imide in the studied alloys, thus indicating that an increased fraction of PVDF in the alloy results in an amorphous PVDF material which is believed to form a homogeneous amorphous mixture with aromatic polyimides, including polyether imide which is consistent with the formation of a miscible polymer blend. Comparison of the heat characteristics of the PVDF/polyether imide alloy with PVDF alloys known in the art, such as PVDF/PMMA and PVDF/PEMA alloys after being annealed, discloses that the PVDF/polyether imide alloy has similar thermodynamic characteristics as other compatible PVDF annealed alloy systems. These observations confirm that PVDF and aromatic polyimide compounds are thermodynamically miscible.

Figure 2:
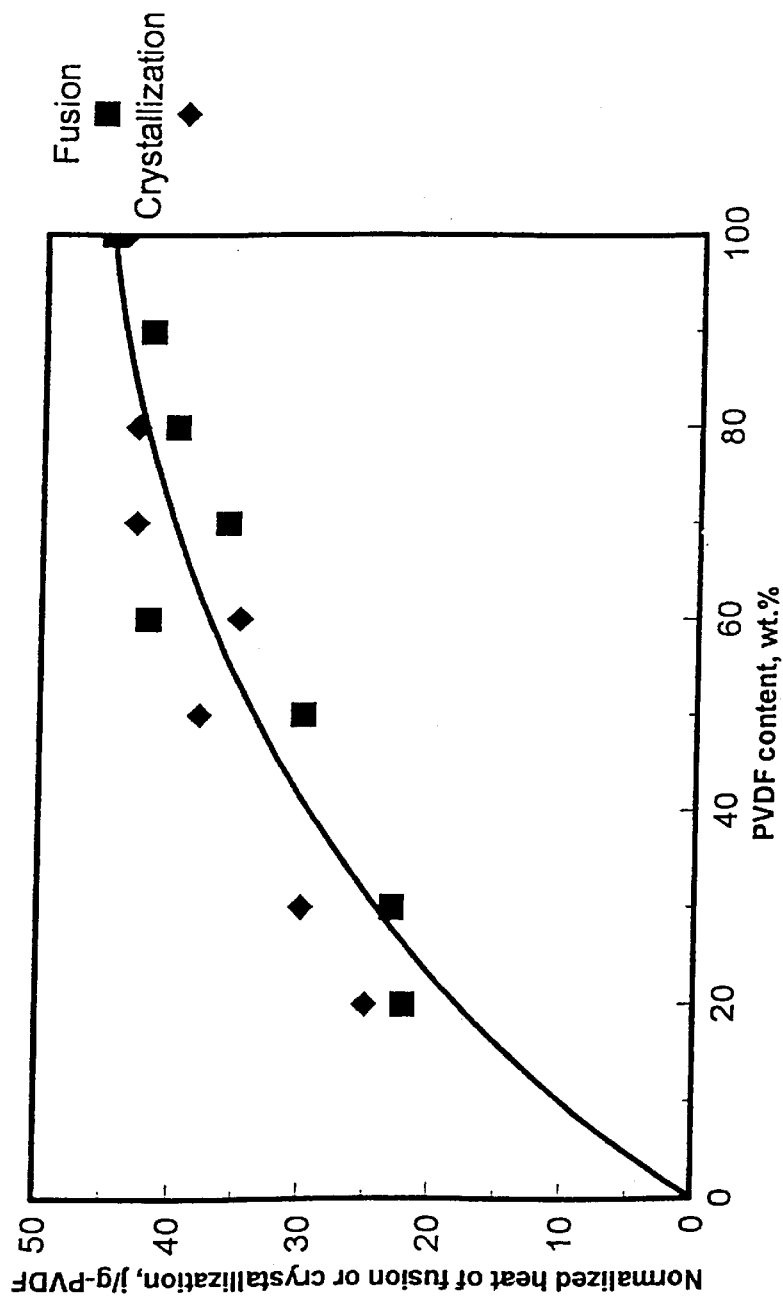
FIG. 2 is a plot of the normalized heat of fusion in joules per gram PVDF in a compatible blend of PVDF and polyether imide.

FIG. 2 shows the effect of polyether imide addition on the heat of PVDF crystallization and fusion in the blends studied to demonstrate aspects of the present invention. When two polymers are completely immiscible, the heat of PVDF crystallization/fusion normalized by PVDF content should remain a constant. FIG. 2 demonstrates that the normalized heat of PVDF crystallization decreases with increased content of the polyether imide which indicates that an increased fraction of PVDF turns to an amorphus material and may form homogenous amorphus mixture with the polyether imide which is consistent with the formation of a miscible polymer blend.

Figure 3:
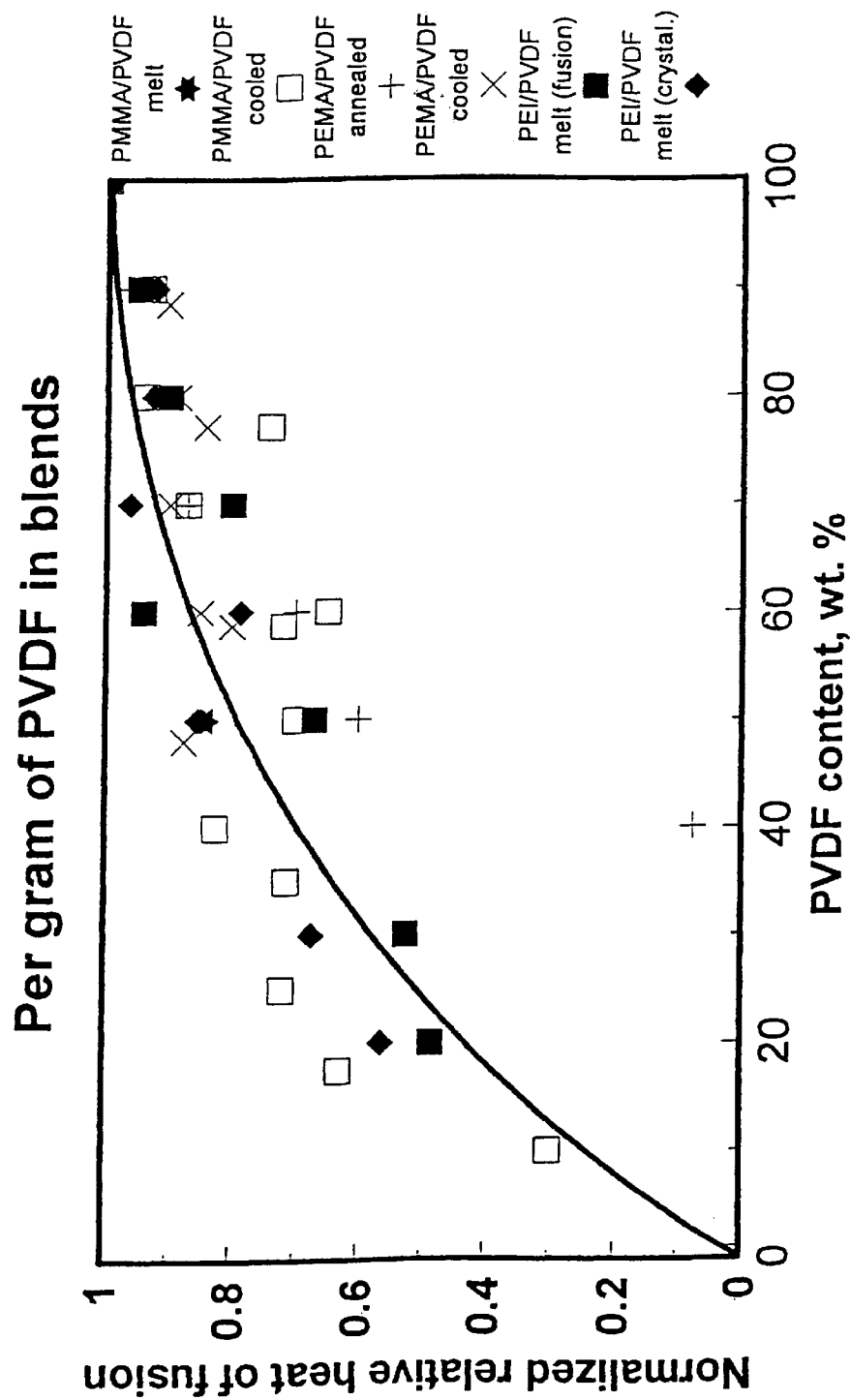
FIG. 3 is a plot of the normalized relative heat of the fusion per gram PVDF in blends of PVDF and PMMA; PVDF and PEMA; and PVDF and polyether imide.

Based on analysis of the melting temperature and crystallization temperature of a PVDF/polyether imide alloy, the PVDF/polyether imide miscible polymer blend alloy should have equivalent thermal characteristics to an annealed PVDF alloy containing a compatible polymer such as PMMA and PEMA. FIG. 3 shows the relative heat of fusion in blends of PVDF and PMMA, PEMA and polyether imide. The relative heat of fusion can be described as the heat of fusion for PVDF in a blend divided by the heat of fusion for pure PVDF. The data for relative heat of fusion in FIG. 3 for PMMA/PVDF and PEMA/PVDF was obtained from literature and normalized for comparison. (See, E. Morales, C. R. Herrero and J. L. Acosta, Polymer Bulletin, 25, 391 (1991) for the data in FIG. 3 regarding relative heat of fusion of PMMA/PVDF melt; T. Nishri and Y. T. Wang, Macromolecules, 8, 909 (1975) for the data in FIG. 3 regarding relative heat of fusion of PMMA/PVDF cooled; R. L. Imken, D. R. Paul and J. W. Barlow, Polymer Engineering and Science, 16 (9), 593 (1976) for the data in FIG. 3 regarding relative heat of fusion of PEMA/PVDF annealed; and T. K. Kwei, G. D. Patterson and T. T. Wang, Macromolecules, 9, 780 (1976) for the data in FIG. 3 regarding relative heat of fusion of PEMA/PVDF cooled). The data for the PEI/PVDF blend was obtained through experimentation (See, FIG. 2).

FIG. 3 demonstrates that the relative heat of fusion for the blends is normalized by PVDF content. Hence, it can be observed that the PVDF/polyether imide alloy behaves with the same thermodynamic characteristics as PVDF/PMMA and PVDF/PEMA alloys after being slowly cooled or being annealed. This demonstrates that PVDF and polyimides, including aromatic polyimides, are miscible.

DSC analysis of the samples also revealed that, surprisingly, the crystallization temperature of the PVDF is initially increased by the addition of a small amount of aromatic polyether imide. The difference between the melting temperature and crystallization temperatures of the PVDF/polyether imide alloys is a constant (~34° C.). This indicates that the polyether imide is an effective nucleating agent for PVDF crystallization. Miscible and compatible polymers used for PVDF alloy systems previously known in the art retard crystallization, which results in PVDF alloys with reduced mechanical strength. Because aromatic imide polymers in the miscible polymer blends act as nucleating agents for PVDF crystallization, the corresponding alloys have increased crystallization speed that is the aromatic imide polymer increases the rate of PVDF crystallization during the thermodynamic miscible process, which allows the miscible polymer blend alloys according to the present invention to possess greater mechanical strength than alloys known in the art. This results in greater hardness and abrasion or mar resistance of the alloy. The increased rate of crystallization of PVDF in a PVDF/aromatic imide miscible polymer blend is particularly pertinent to applications of PVDF blends involving extrusion molded products.

While the invention has been described in terms of a preferred embodiment, the scope of the invention is set forth in the following claims.

What is claimed is:

1. A polymer blend comprising from about 50% to about 99% PVDF and from about 50% to about 1% aromatic polyimide in the form of a miscible polymer blend wherein said aromatic polyimide is a nucleating agent which increases the rate of PVDF crystallization in the miscible polymer blend.

2. The polymer blend of claim 1 wherein said aromatic polyimide is polyether imide.

3. The polymer blend of claim 1 wherein said PVDF is a homopolymer of polyvinylidene fluoride or a copolymer comprising at least about 80% polyvinylidene fluoride and up to about 20% hexafluoropropylene.

4. An extrusion molded article comprising the miscible polymer blend of claim 1.

5. A film material comprising the miscible polymer blend of claim 1.

6. A method for making a polymer blend of PVDF and aromatic polyimide comprising the steps of separately dissolving PVDF and aromatic polyimide in a solvent to form separate solutions and then mixing said solutions to form a miscible polymer blend of from about 50% to about 99% PVDF and from about 50% to about 1% aromatic polyimide wherein said aromatic polyimide is a nucleating agent which increases the rate of PVDF crystallization in the miscible polymer blend.

7. The method of claim 6 wherein said solvent is N-methylpyrrolidone.

8. The method of claim 6 wherein said PVDF is a homopolymer of polyvinylidene fluoride or a copolymer comprising at least about 80% polyvinylidene fluoride and up to about 20% hexafluoropropylene.

9. The method of claim 6 wherein the aromatic polyimide is polyether imide.

10. A polymer blend comprising about 50% PVDF and about 50% aromatic polyimide in the form of a miscible polymer blend wherein said aromatic polyimide is a nucleating agent which increases the rate of PVDF crystallization in the miscible polymer blend.

11. The polymer blend of claim 10 wherein said aromatic polyimide is polyether imide.

12. The polymer blend of claim 10 wherein said PVDF is a homopolymer of polyvinylidene fluoride or a copolymer comprising at least about 80% polyvinylidene fluoride and up to about 20% hexafluoropropylene.

* * * * *